United States Patent
Di Meco et al.

(10) Patent No.: US 8,475,309 B2
(45) Date of Patent: Jul. 2, 2013

(54) TOOTHED BELT AND TIMING CONTROL SYSTEM

(75) Inventors: Marco Di Meco, Pescara (IT); Carlo Baldovino, Pescara (IT)

(73) Assignee: Dayco Europe S.R.L., Chieti (IT)

( * ) Notice: Subject to any disclaimer, the term of this patent is extended or adjusted under 35 U.S.C. 154(b) by 653 days.

(21) Appl. No.: 12/161,197

(22) PCT Filed: Jan. 18, 2007

(86) PCT No.: PCT/EP2007/050514
§ 371 (c)(1),
(2), (4) Date: Apr. 10, 2009

(87) PCT Pub. No.: WO2007/082920
PCT Pub. Date: Jul. 26, 2007

(65) Prior Publication Data
US 2010/0004082 A1      Jan. 7, 2010

(30) Foreign Application Priority Data
Jan. 19, 2006  (WO) ............... PCT/IT2006/000032

(51) Int. Cl.
*F16G 1/28*       (2006.01)

(52) U.S. Cl.
USPC ............................................................. 474/205

(58) Field of Classification Search
USPC ............................... 474/204, 205, 206
See application file for complete search history.

(56) References Cited

U.S. PATENT DOCUMENTS

| | | | |
|---|---|---|---|
| 4,514,179 A * | 4/1985 | Skura | 474/204 |
| 4,518,375 A * | 5/1985 | Mashimo et al. | 474/205 |
| 4,652,252 A * | 3/1987 | Westhoff et al. | 474/204 |
| 5,234,387 A * | 8/1993 | Fujiwara et al. | 474/205 |
| 5,531,649 A * | 7/1996 | Osako et al. | 474/205 |
| 5,545,097 A * | 8/1996 | Kitazumi et al. | 474/266 |
| 5,599,246 A * | 2/1997 | Fujiwara et al. | 474/205 |
| 5,611,745 A * | 3/1997 | Uto et al. | 474/205 |
| 5,860,883 A * | 1/1999 | Jonen et al. | 474/205 |
| 6,086,500 A * | 7/2000 | Yamada et al. | 474/202 |
| 6,106,943 A * | 8/2000 | Akiyama | 428/375 |
| 6,117,035 A * | 9/2000 | Isshiki et al. | 474/205 |
| 6,220,983 B1 * | 4/2001 | Osako et al. | 474/260 |
| 6,352,488 B1 * | 3/2002 | Morris et al. | 474/263 |
| 6,358,171 B1 * | 3/2002 | Whitfield | 474/266 |

(Continued)

FOREIGN PATENT DOCUMENTS

| | | |
|---|---|---|
| CA | 2 085 516 | 6/1993 |
| CA | 2 508 342 | 7/2004 |

(Continued)

*Primary Examiner* — William E Dondero
*Assistant Examiner* — Mark K Buse
(74) *Attorney, Agent, or Firm* — Frommer Lawrence & Haug LLP; Ronald R. Santucci

(57) ABSTRACT

Toothed belt comprising a body, a plurality of resistant inserts or cords and a plurality of teeth extending from at least one surface of the body; the teeth are coated with a coating fabric. The body is made of a first elastomeric material formed. The fabric is treated with a fabric treatment comprising a second elastomeric material. The resistant inserts or cords are treated with cord treatment comprising a third elastomeric material. The first, second and third elastomeric material are formed of a mixture of one or more copolymers obtained from diene monomers and monomers containing nitrile groups, in which the nitrile groups are between 30 wt % and 39 wt %.

18 Claims, 4 Drawing Sheets

U.S. PATENT DOCUMENTS

| | | | | |
|---|---|---|---|---|
| 6,409,621 B1 * | 6/2002 | Billups et al. | ............... | 474/263 |
| 6,561,937 B1 * | 5/2003 | Wegele | .................. | 474/263 |
| 6,689,005 B2 * | 2/2004 | Hasaka et al. | ............. | 474/267 |
| 7,056,249 B1 * | 6/2006 | Osako et al. | .................. | 474/260 |
| 7,695,386 B2 * | 4/2010 | Wood et al. | ................... | 474/271 |
| 7,749,118 B2 * | 7/2010 | Baldovino et al. | ............ | 474/205 |
| 7,759,427 B2 * | 7/2010 | Wood et al. | ................... | 525/191 |
| 7,824,284 B2 * | 11/2010 | Burlett | ............................. | 474/8 |
| 7,842,354 B2 * | 11/2010 | Wood et al. | ................... | 427/542 |
| 2003/0004025 A1 | 1/2003 | Okuno et al. | | |
| 2010/0004082 A1 * | 1/2010 | Di Meco et al. | ............. | 474/205 |

FOREIGN PATENT DOCUMENTS

| | | |
|---|---|---|
| EP | 0 674 121 A | 9/1995 |
| EP | 1 157 813 A | 11/2001 |
| EP | 1 571 253 A | 9/2005 |
| EP | 1 571 253 A1 * | 9/2005 |
| JP | 09296378 | 11/1997 |
| WO | WO 2004/057099 | 7/2004 |
| WO | WO 2005/080820 | 9/2005 |
| WO | WO 2005/080821 * | 9/2005 |

* cited by examiner

US 8,475,309 B2

TOOTHED BELT AND TIMING CONTROL SYSTEM

TECHNICAL FIELD

This application is a 371 of PCT/EP2007/050514 filed on Jan. 18, 2007, published on Jul. 26, 2007 under publication number WO 2007/082920 A1 which claims priority benefits from International Patent Application PCT/IT2006/000032 filed Jan. 19, 2006, the disclosure of which is incorporated herein by reference.

BACKGROUND ART

Toothed belts generally comprise a body made of elastomeric material, in which is embedded a plurality of longitudinal filiform resistant inserts, also referred to as "cords", and a plurality of teeth coated with a coating fabric.

Each component of the belt contributes to increase the performance in terms of mechanical resistance, so as to reduce the risk of failure of the belt and to increase the specific transmissible power.

The coating fabric of the belts increases the resistance to abrasion and hence protects the working surface of the belt from wear that is due to the rubbing between the flanks and cavities of the teeth of the belt and the flanks and the cavities of the grooves of the pulley with which the belt interacts.

In addition, the coating fabric decreases the coefficient of friction on the working surface, reduces the deformability of the teeth and above all reinforces the root of the tooth, thus preventing the tooth shear.

The coating fabric used can be formed by a single layer or, alternatively, can be double-layered so as to guarantee a greater strength and greater rigidity. The fabric is normally treated with a compound designed to increase the adherence between the body and the fabric itself.

The cords contribute to ensure the necessary mechanical characteristics of the belt and contribute essentially to the modulus of the belt itself and in particular thus ensure maintenance of performance of the belt over time. The cords are generally formed by twisting fibres with high modulus a number of times.

Also the cords are normally treated with compounds designed to increase the compatibility of the fibres with the body mixture that surrounds the cords themselves.

For example, the cords can be treated with elastomeric latexes that function as "adhesives".

Finally, the body mixture enables connection of the various aforesaid elements and must present adequate hardness and ensure that the various elements constituting the belt itself contribute synergistically to the final performance of the belt itself.

The body mixtures have a base of one or more elastomeric materials eventually enriched with fibres to increase their hardness.

In order to be able to improve the lifetime and the performance of the belts there is a continuous search for new solutions to enable an increase in the chemico-physical compatibility between the various materials that constitute the basic elements of the belts. For this purpose, there is, for example, the search for new treatments for the cords and new treatments for the coating fabric of the teeth that will enable an increase in the compatibility between the fabric, the cords, and the body.

DISCLOSURE OF INVENTION

A first object of the present invention is consequently to obtain a belt that will present a long lifetime and that will hence present excellent mechanical characteristics of adhesion, resistance to wear, precision of meshing, and low acoustic emission.

A second object of the present invention is to select appropriately the materials so as to enable excellent characteristics to be achieved all along the range of service temperatures of the belt and therefore from −30° C. up to 180° C.

A third object of the present invention is to optimize the relative chemical compatibility between the various elements that constitute the belt itself.

According to the present invention said aims are achieved by a belt according to claim 1.

According to the present invention there is moreover provided a timing control system according to claim 21.

BRIEF DESCRIPTION OF THE DRAWINGS

For a better understanding of the present invention, this is described also with reference to the annexed plate of drawings, wherein.

BEST MODE FOR CARRYING OUT THE INVENTION

In the following reference will be made specifically to a toothed belt, but the invention clearly refers also to other similar belts and generally to transmission belts.

Figure 1:
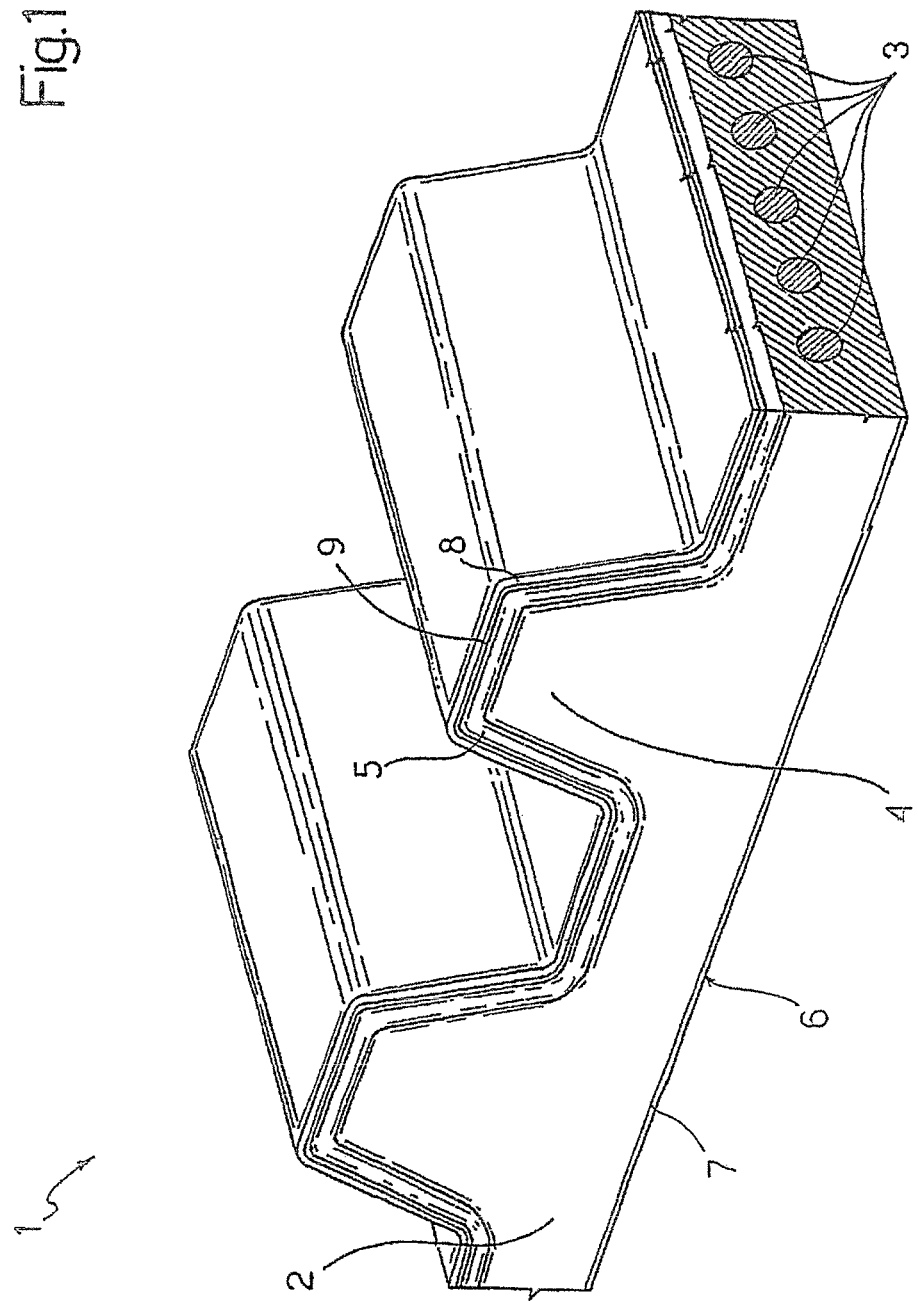
FIG. 1 is a partial perspective view of a toothed belt according to the present invention.

Designated as a whole by 1 in FIG. 1 is a toothed belt. The belt 1 comprises a body 2 made of elastomeric material, in which a plurality of longitudinal filiform resistant inserts or cords 3 is embedded. The body 2 has: a first face provided with teeth 4 coated with a fabric or coating fabric 5 and a second face or back 6 of the belt. Preferably, also the back 6 is coated with a coating fabric 7.

Even more preferably, the fabric 5 that coats the teeth 4 is the same as the fabric 7 that coats the back 6.

Preferably, the body 2 is made of a mixture constituted by one or more elastomers, which are designated as a whole for reasons of convenience as "first elastomeric material", which is basically formed of a mixture of one or more copolymers, which are formed starting from a monomer containing nitrile groups and from a diene, in which the monomers containing the nitrile groups are in a percentage of between 30 wt % and 39 wt % with respect to the total final copolymers.

"Basically formed" refers to the fact that small percentages of other polymers or copolymers can be added to the elastomeric material without adversely affecting the chemical compatibility between the body mixture and the other elements constituting the toothed belt and hence without departing from the scope of the present invention.

More preferably, the nitrile groups are in a percentage of between 34 wt % and 38 wt % with respect to the total copolymers, even more preferably between 34 and 36 wt %.

Most preferably, the nitrile groups are in a percentage of approximately 34 wt % with respect to the total copolymers.

Preferably, the copolymer or copolymers used is/are hydrogenated acrylonitrile butadiene rubber or HNBR.

Preferably, the HNBR used is with a high degree of hydrogenation; for example, the so-called completely saturated HNBR and preferably an HNBR having a residual percentage of double bonds at the most of 0.9% can be used, but alternatively HNBR with a lower degree of insaturation, such as, for example, HNBR having a degree of saturation of 4% or 5.5%, the so-called partially saturated HNBR, can also be used.

Examples of HNBR copolymers usable as body mixture according to the present invention, but also in the different treatments of the various elements constituting the toothed belt, are the copolymers belonging to the family of the THERBAN produced by Lanxess, such as THERBAN 3407 with 34 wt % of nitrile groups and a degree of hydrogenation of at the most 0.9%, THERBAN 3406 with 34 wt % of nitrile groups and a degree of insaturation of at the most 0.9%, THERBAN 3607 with 36 wt % of nitrile groups and a degree of insaturation of at the most 0.9%, THERBAN 3446 with 34 wt % of nitrile groups and a degree of insaturation of at the most 4%, THERBAN 3447 with 34 wt % of nitrile groups and a degree of insaturation of at the most 5.5%, THERBAN 3627 with 36 wt % of nitrile groups and a degree of insaturation of at the most 2%, THERBAN 3629 with 36 wt % of nitrile groups and a degree of insaturation of at the most 2%, THERBAN 3907 with 39 wt % of nitrile groups and a degree of insaturation of at the most 0.9% or mixtures thereof.

Alternatively, it is also possible to use HNBRs produced by Nippon Zeon under the commercial name of ZETPOL. In particular, ZETPOL 2000 with 36 wt % of nitrile groups and a degree of insaturation of at the most 0.9%, ZETPOL 2000L with 36 wt % of nitrile groups and a degree of insaturation of at the most 0.9%, ZETPOL 2010 with 36 wt % of nitrile groups and a degree of insaturation of at the most 4%, ZETPOL 2010L with 36 wt % of nitrile groups and a degree of insaturation of at the most 4%, ZETPOL 2010H with 36 wt % of nitrile groups and a degree of insaturation of at the most 4%, ZETPOL 2020 with 36 wt % of nitrile groups and a degree of insaturation of at the most 5.5%, ZETPOL 2020L with 36 wt % of nitrile groups and a degree of insaturation of at the most 5.5% or mixtures thereof.

Preferably totally hydrogenated HNBRs are used, i.e. having a degree of insaturation lower than 1%. These HNBR permit to obtain the best values in the whole range of temperature.

The first elastomeric material can moreover comprise conventional additives, such as, for example, reinforcement agents, fillers, pigments, stearic acid, accelerators, vulcanizing agents, antioxidants, activators, initiators, plasticizers, waxes, prevulcanizing inhibitors, anti-degrading agents, process oils, and the like.

Advantageously, as filler carbon black can be used, which is preferably added in an amount comprised between 0 and 80 phr, more preferably between 20 and 60 phr, most preferably approximately 40 phr. Advantageously, light fillers such as talcum, calcium carbonate, silica and silicates are added in an amount preferably of between 0 and 80 phr, more preferably between 20 and 60 phr, most preferably approximately 40 phr. It may moreover be advantageous to use silanes in an amount comprised between 0 and 5 phr.

Advantageously, zinc and magnesium oxides are added in an amount preferably of between 0 and 15 phr.

Advantageously, ester plasticizers are added, such as trimellitates or ether esters in an amount preferably of between 0 and 20 phr.

Advantageously, vulcanizing co-agents are added, such as tri-allyl cyanidates, organic or inorganic methacrylates, such as salts of metals preferably in an amount of between 0 and 20 phr or organic peroxides, such as for example isopropyl benzene peroxide preferably in an amount of between 0 and 15 phr.

Preferably, the first elastomeric material comprises reinforcement fibres, more preferably in an amount of between 2 and 40 phr, most preferably 20 phr. Preferably, the reinforcement fibres have a length comprised between 0.1 mm and 10 mm.

Fibre enables a further improvement in the mechanical characteristics of the mixture constituting the body. Preferably, the reinforcement fibres comprise aromatic polyamides, preferably paramides; for example, Technora© fibres can advantageously be used, which can be adherized to the mixture by means of an RFL-based treatment (RFL—resorcin-formaldehyde latex).

For example, the latex used can be a VP-SBR-based latex, i.e. a vinylpyridine-styrene-butadiene copolymer latex.

Preferably aramidic fibres are used, such as for example Technora fibres produced by Teijn, more preferably with a length of 1 mm.

The coating fabric 5 of the teeth 4 or the coating fabric 7 of the back 6 can be made up of one or more layers and can be obtained using different weaving techniques, for example, the weaving technique known as 2×2 twill.

The coating fabric 5 of the teeth 4 preferably comprises aliphatic or aromatic polyamide, more preferably aromatic polyamide (aramide).

Preferably, the fabric used has a composite structure constituted by a weft and a warp, in which the weft is constituted by a thread formed by an elastic thread as core and by at least one pair of composite threads wound on said elastic thread. Each composite thread comprises a thread with high thermal and mechanical resistance and at least one coating thread wound on the thread with high thermal and mechanical resistance. Preferably each composite thread comprises a thread with high thermal and mechanical resistance and a pair of coating threads wound on the thread with high thermal and mechanical resistance. The elastic thread is preferably made of polyurethane. The thread with high thermal and mechanical resistance is preferably made of para-aromatic polyamide.

According to the present invention the fabric 5 is treated with a fabric treatment.

The term "fabric treatment" refers to a solution for the treatment of the fabric of toothed belts.

Preferably the fabric of the belt is dipped in the fabric treatment and therefore the belt comprises the fabric treatment after that the belt is being dipped in the solution. The fabric treatment is a non-aqueous solution. Preferably the non aqueous solvent is constituted by a mixture of MEC 30% and toluol 70%. More preferably the ratio between solvent and elastomer is from 6 to 8 part of solvent for each part of elastomer.

According to the present invention the fabric treatment comprises a second elastomeric material formed of a mixture of one or more copolymers, which is/are formed starting from a monomer containing nitrile groups and from a diene, in which the monomers containing the nitrile groups are in a weight percentage of between 30 wt % and 39 wt % with respect to the total final copolymers. More preferably, the nitrile groups are in a weight percentage of between 34 wt % and 36 wt % with respect to the total final copolymers. Most preferably is about 34 wt %.

Preferably, the copolymer/s is/are HNBR. More preferably, it is one of the HNBRs previously mentioned or a mixture thereof.

Advantageously after that the fabric of the belt is dipped in the fabric treatment, the fabric is further treated with a second fabric treatment by spreading.

Preferably the second fabric treatment is similar to composition to the first treatment and therefore comprises a non aqueous solution of a solvent comprising a further elastomeric material equal to the one of the first fabric treatment.

Preferably the fabric 5 is coated with a resistant layer 8. Optionally, an adhesive 9 is moreover set between the fabric 5 and the resistant layer 8.

Preferably the resistant layer 8 is made up of a fluorinated plastomer with the addition of an elastomeric material, and more preferably the fluorinated plastomer is present in an amount greater in weight with respect to the elastomeric material.

An example of resistant layer that may be used is described, in the patent No. EP1157813, filed in the name of Dayco Europe.

According to the present invention, the fluorinated plastomer is preferably a compound with a base of polytetrafluoroethylene.

The elastomeric material is preferably constituted by an elastomeric material comprising one or more copolymers, which is/are formed starting from a monomer containing nitrile groups and from a diene, in which the monomers containing the nitrile groups are in a weight percentage of between 30 wt % and 39 wt % with respect to the total final copolymers. More preferably the nitrile groups are in a weight percentage of between 34 wt % and 38 wt %, even more preferably between 35 and 37 wt %, most preferably about 36 wt %.

Preferably, the elastomeric material with which the fluorinated plastomer is mixed to form the resistant layer 8 is HNBR; even more preferably it is a modified HNBR with a zinc salt of polymethacrylic acid; for example, ZEOFORTE ZSC (a registered trademark of Nippon Zeon) can be used.

Preferably, the fluorinated plastomer is present in an amount comprised between 101 and 150 parts in weight per 100 parts of elastomeric material.

The resistant layer 8 moreover comprises a peroxide as vulcanizing agent. The peroxide is normally added in an amount of between 1 and 15 parts in weight per 100 parts of elastomeric material.

Preferably, also the back of the toothed belt is coated with a coating fabric 7, which is preferably constituted by an aliphatic or aromatic polyamide, more preferably by polyamide 6/6 with high thermal resistance and high toughness.

Preferably, the fabric 7 for coating the back is the same as the previous one.

Preferably, also the coating fabric 7 of the back is coated with a resistant layer. Even more preferably, the resistant layer that coats the fabric for coating the back is the same as the fabric 5 for coating the teeth and that gives particular improvement in the mechanic resistance of the belt and has proved to be particularly advantageous in timing control systems in which the belt works in direct contact with engine oil at high temperature for the entire lifetime.

Preferably cords made of a material chosen in the group consisting of glass fibres, aramidic fibres, carbon fibres, PBO fibres are used; in addition, it is also possible to use cords of the so-called "hybrid" type, i.e., comprising strands of different materials, advantageously chosen from the ones previously mentioned.

Preferably, the cord is made of high modulus glass fibres, for example in configuration 22.5 3×18.

The fibres constituting the cords are treated with a "cord treatment".

Preferably the cord treatment is constituted by a solution or a coating liquid. The term "cord treatment" refers therefore to a solution for the treatment of the cord of toothed belts.

Preferably, the cord treatment comprises an aqueous adhesive and more preferably one comprising more than 50 wt % of water, comprising a latex of a third elastomeric material and a vulcanizing agent.

Preferably, the third elastomeric material is in form of a latex dispersed in the coating liquid. The third elastomeric material is formed of a mixture of one or more copolymers, which is/are formed starting from a monomer containing nitrile groups and from a diene, in which the monomers containing nitrile groups are in a weight percentage of between 30 wt % and 39 wt % with respect to the total final copolymers. More preferably, the nitrile groups are in a weight percentage of between 30 wt % to 36 wt % with respect to the total final copolymers, even more preferably 32 to 34 wt %, most preferably about 33 wt %.

More preferably the coating liquid is formed by a vulcanized HNBR latex with a vulcanizing agent, preferably water-soluble peroxides. The cord treatment is preferably chosen among the ones disclosed in the patent application No. WO2004057099, filed in the name of Nippon Glass.

The choice of a cord treatment comprising a coating liquid formed by an HNBR latex in combination with a vulcanizing agent in an aqueous solution comprising more than 50% of water has proven particularly advantageous in comparison with the known cord treatments using either a VP-SBR mixture (vinyl-pyridine-stirene-butadiene rubber) or CSM (clorosulphonated polyethylene rubber). Particularly the cord treatment of the present invention improves greatly the resistance to high temperature. Therefore belts comprising the cord treatment according to the present invention when in combination of opportunely selected range of the body mixtures together with opportunely selected range of the fabric treatment have an improved lifetime at high temperatures.

Figure 2:
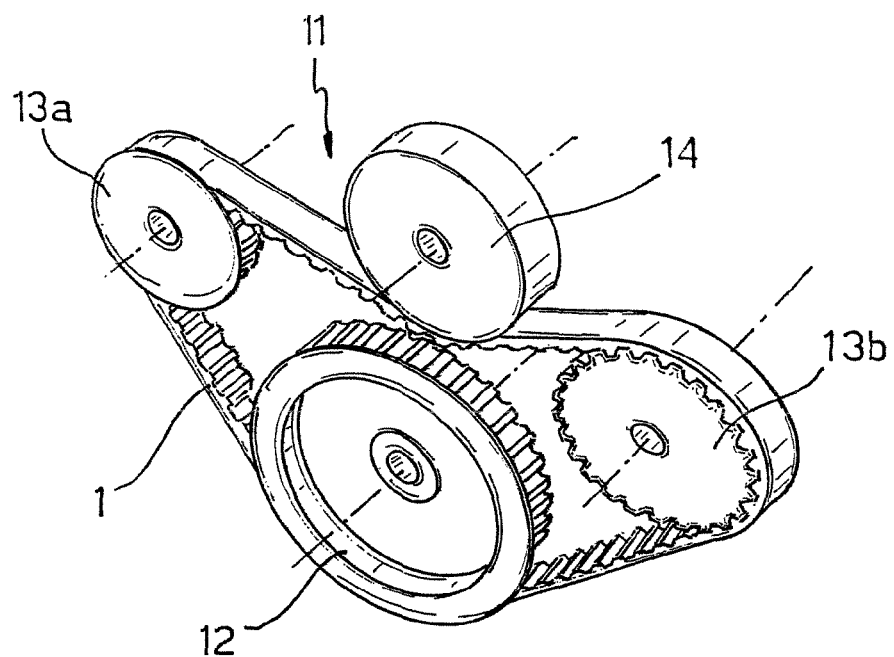
FIG. 2 presents a diagram of a first timing control system, which uses a first toothed belt according to the present invention.

The belt according to the present invention can be used, for example, in a timing control system of the type represented in FIG. 2. The timing control system is designated in the figures as a whole by the number 11 and comprises a drive pulley 12 rigidly fixed to the engine shaft (not illustrated), a first driven pulley 13a and a second driven pulley 13b and a belt tensioner 14 for tensioning the toothed belt.

The belt 1 according to the present invention can also be used for the entire lifetime working in oil, in which case is also designated as oil toothed belt or oil belt.

"Oil toothed belt" refers to belts suitable to maintain their mechanic characteristics when used in direct contact with oil or partially immersed in engine oil at high temperature up to 180° C. for their entire lifetime, assuring a lifetime of more than 100.000 km. Oil belts can substitute chain and gear without need of further changes in the engine.

These oil belts are used inside the basement of the engine where they are in contact with oil for their whole lifetime either sprayed directly on the belt or partially immersed in the oil bath. Particularly the basement comprise the engine, an oil bath and an oil belt.

Figure 4:
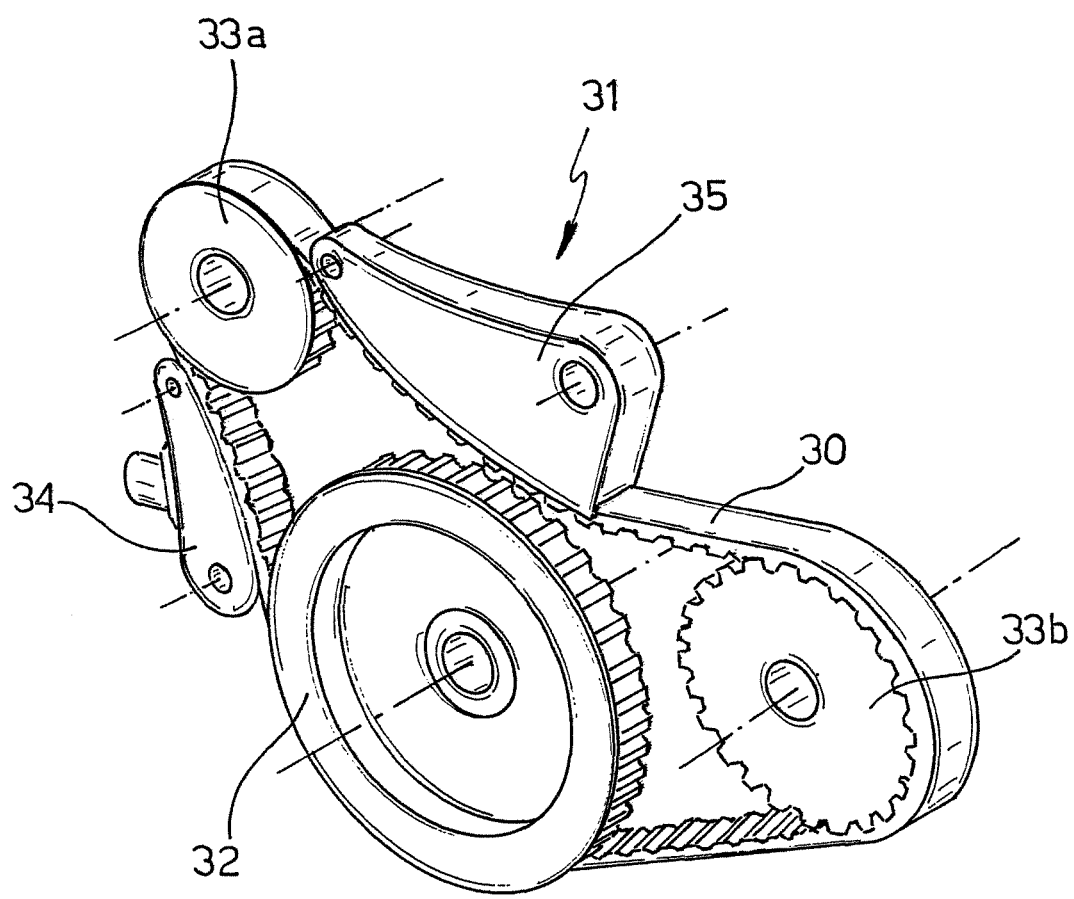
FIG. 4 presents a diagram of a third timing control system, which uses a third toothed belt according to the present invention.

For example oil belts according to the present invention may be used, in a timing control system for a motor vehicle of the type shown in FIG. 4. The timing control system is indicated in the figure as a whole with the number 11 and comprises a driving pulley 12 rigidly fixed to the drive shaft, not shown, a first 13a and a second 13b driven pulley and a tensioner 14 to tension the toothed belt.

Figure 5:
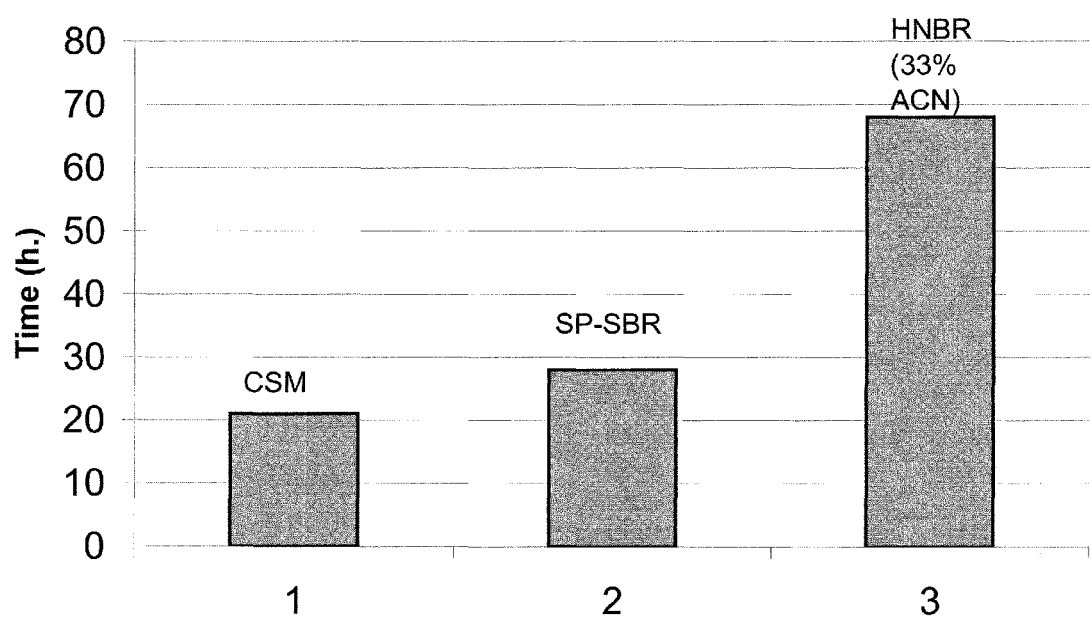
FIG. 5 illustrates a chart that gives the results of a duration test at high temperature for belts made according to the present invention compared with known belts.

According to a second alternative embodiment, shown in FIG. 5, a toothed belt according to the invention is indicated with the number 20, with a toothing on both faces and therefore having a resistant fabric that covers both toothings.

Figure 3:
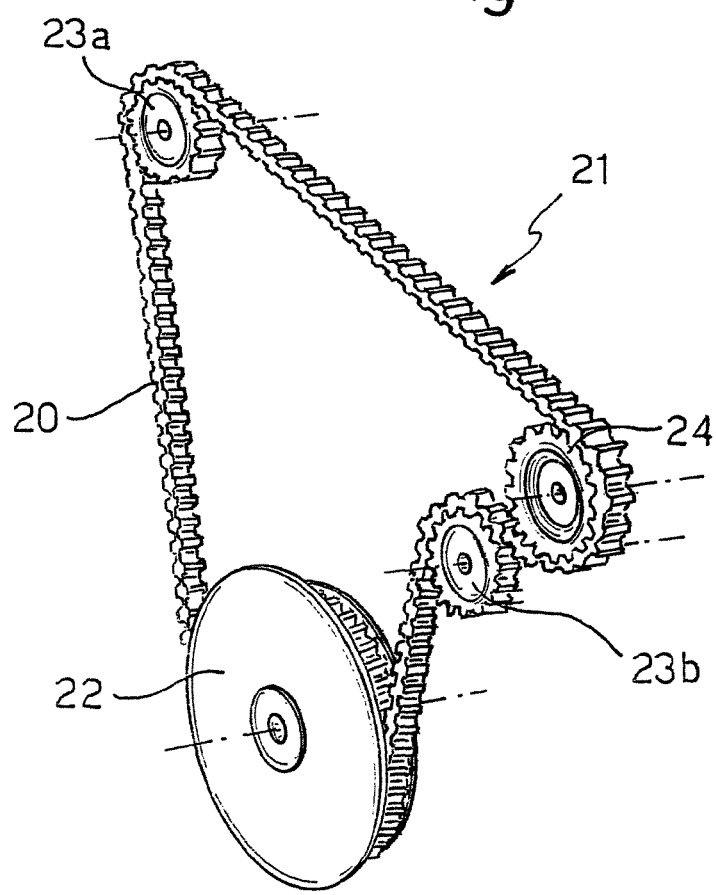
FIG. 3 presents a diagram of a second timing control system, which uses a second toothed belt according to the present invention.

A toothed belt 20 can, for example, be used in a timing control system for a motor vehicle of the type shown in FIG. 3. The timing control system is indicated in the figure as a whole with the number 21 and comprises a driving pulley 22, fixed rigidly to the drive shaft, not shown, a first 23a, a second 23b and a third 24 driven pulley.

According to a third embodiment of the present invention, shown in FIG. 6, a toothed belt 30 according to the present invention can advantageously be used in a timing control system indicated in the figures with the number 31, which comprises a driving pulley 32, fixed rigidly to the drive shaft, not shown, a first 33a and a second 33b driven pulley, a pad tensioner 34 and a pad 35.

In use, the toothed belts 1,20 and 30 in the respective control systems 11,21 and 31 are in direct contact with oil.

FIGS. 2 to 4 refer to control systems relative to movement of the balancing countershafts, but it is clear that the toothed belt according to the present invention may also be used in "cam to cam" systems or for movement of the oil pump.

In these cases during operation the belt is partly immersed in an oil bath.

The advantages that the belts of the present invention enable emerge clearly from an examination of the characteristics of the belt.

The inventive combination of the use of a specific range of 30 to 39 wt % of nitrile units in the first elastomeric material forming the body of the belt, together with the use of a range of 30 to 39 wt % of nitrile units in the second elastomeric material of the fabric treatment together with the use of a range of 30 to 39 wt % of nitrile units in the third elastomeric material of the cord treatment, have proven to improve the chemical-physical compatibility, the mechanic characteristics, a greater adhesion, and a greater resistance to wear.

The toothed belt according to the present invention will now be described also with examples, without this implying any limitation to said examples.

Particularly in the examples the influence of the single ranges and the combination thereof are evidenced. Different tests are performed to compare the known prior art belts with belts manufactured according to the present invention.

EXAMPLES 1-5

Body Mixture and Combined Ranges

Table 1 shows belts designated by the numbers 1 to 5, made according the present invention and therefore having percentages of nitrile groups (ACN) in the HNBR forming the body mixture (examples 1 to 3) within the range of 30 to 39 wt % compared with belts (examples 4 and 5) having percentages of nitrile groups (ACN) in the HNBR forming the body mixture outside the claimed ranges.

HNBRs are used for the body mixtures having a grade of 0.9%.

TABLE 1

| Example | Percentages of ACN in HNBR of the body | Percentages of ACN in HNBR of cord treatment | Percentages of ACN in HNBR of fabric treatment | Percentages of ACN in HNBR of fabric treatment for the back | Test (h) |
|---|---|---|---|---|---|
| 1 | 33 | 33 | 33 | — | 156 |
| 2 | 39 | 33 | 33 | — | 156 |
| 3 | 44 | 33 | 33 | — | 144 |
| 4 | 28 | 33 | 33 | — | 216 |
| 5 | 49 | 33 | 33 | — | 96 |

The belts are dynamically tested with duration tests at temperature of −25° C.

The test cycle comprise a first step of cooling for 8 h (not considered in duration). After the cooling step the engine is started for 30 sec. with a of 1000 rpm, and then it is stopped and cooled again for 30 min. of cooling and this ends a first cycle. Then a second cycle is started and therefore the engine is started again for 30 sec and then stopped and cooled for 30 min. therefore each cycle is constituted by 30 sec of working and 30 min of cooling.

After 24 cycles, i.e. about each 12 h, the operator check if any cracks are visible and than the belt is again cooled for 2 h. After that cycles are started again until the operator individuates visible cracks, which constitutes the end of the test.

The conditions in which the test was conducted are given in Table 4.

TABLE 1b

| | |
|---|---|
| Belt type: | 138STP150 |
| Belt width: | 15 mm |
| Pulley profile: | STP |
| Driver pul. Speed: | 1000 rpm |
| Fitting tension: | 250N |
| Torque: | 0 Nm |
| Room temperature: | −25° C. |
| Check: | each 12 h |
| End of test: | crack on belt back |

As it can be inferred from table 1 the belts having an ACN content in the body mixture within the claimed range permit to obtain higher performance at low temperature in comparison with the belts having an ACN content outside the range. Particularly the results obtained with low ACN content are better than the results obtained above an ACN content of 39%. Therefore belts containing the claimed combination of ranges have an improved lifetime at low temperature in respect to the known belt.

EXAMPLES 6-10

Fabric Treatment and Combined Ranges

Table 2 shows belts made according the present invention and therefore having percentages of nitrile groups (ACN) in the HNBR forming the fabric treatment (examples 6 and 7) within the range of 30 to 39 wt % compared with belts (examples 8 to 10) having percentages of nitrile groups (ACN) in the HNBR forming the fabric treatment outside the claimed ranges. HNBRs are used for the fabric treatment having a grade of 0.9%.

TABLE 2

| Ex. | Percentages of ACN in HNBR of the body | Percentages of ACN in HNBR of cord treatment | Percentages of ACN in HNBR of fabric treatment | Percentages of ACN in HNBR of fabric treatment for the back | Adhesion test after 10 million cycles (N/cm) |
|---|---|---|---|---|---|
| 6 | 33 | 33 | 33 | — | 187 |
| 7 | 33 | 33 | 39 | — | 256 |
| 8 | 33 | 33 | 44 | — | 248 |
| 9 | 33 | 33 | 49 | — | 263 |
| 10 | 33 | 33 | 28 | — | 140 |

In particular, the belts have undergone adhesion test and the conditions of the test were according to ISO 12046. In particular, the belt according to the invention has undergone tests in contact with oil and particularly in control systems in which oil is sprayed by means of a pipe directly onto the belt.

After 20,000,000 cycles in oil the test can not be prosecuted due to the tooth shear failure of the prior art belts in which the content of ACN or nitrile groups of the HNBR of the fabric treatment is 28 wt %.

Therefore the adhesion has been measured after 10,000,000 cycles.

As it can be inferred from table 2 the belt having an ACN content in the fabric treatment within the claimed range obtain optimal values of adhesion and therefore permit to lower the tooth wear permitting also in this case to obtain an improved lifetime of the belt.

Optimal values in the adhesion tests are obtained the higher is the ACN content, whilst below an ACN content of 30% the adhesion has proven to be very poor.

Therefore adhesion test give result opposite to the aforementioned cold temperature tests.

Therefore only the combination of the range of ACN from 30 to 39% permit to optimal results both in tests at cold temperature and in adhesion tests.

EXAMPLES 11-13

Cord Treatment and Combined Ranges

Table 3 shows belts made according the present invention and therefore having percentages of nitrile groups (ACN) in the HNBR forming the cord treatment (example 11) within the range of 30 to 39 wt % compared with belts (examples 8 to 9) having percentages of nitrile groups (ACN) in the HNBR forming the fabric treatment outside the claimed ranges.

TABLE 3

| Ex | Percentages of ACN in HNBR of the body | Cord treatment | Percentages of ACN in HNBR of fabric treatment | Percentages of ACN in HNBR of fabric treatment for the back | Duration test at 180° C. |
|---|---|---|---|---|---|
| 11 | 33 | HNBR with ACN 33 wt % | 33 | 33 | 68 |
| 12 | 33 | VP-SBR | 33 | 33 | 28 |
| 13 | 33 | CSM | 33 | 33 | 21 |

The conditions in which the test was conducted are given in Table 4.

TABLE 4

| Type of Belt | 141 RHX 150 |
|---|---|
| Engine rpm | 4000 rpm |
| Temperature of back of belt | 180° C. |

The values of duration tests for measuring the lifetime of the belt in dynamic condition and in working condition, i.e. at high temperature, and precisely at 180° C., are given in chart of FIG. 5. To execute said tests a VW 1900 TDI diesel engine was used with VP 44 rotary pump or driven electrically without pistons.

As it can be inferred from the chart of FIG. 5, the belt having an ACN content in the HNBR of the cord treatment within the claimed range have an higher resistance in test executed at high temperature. Particularly they have a lifetime up to three time those of the known belts.

Therefore the aim of the present invention, i.e. to have a belt which is capable to maintain the mechanical and physical characteristic both at low and at high temperature, is obtained not only with the combination of opportunely selected ACN ranges of the HNBRs of the body mixtures and the fabric treatment, but also if the cord treatment comprises an HNBR with an opportunely selected range of ACN.

The tests at high temperature show that only the combination of the three ranges of ACN in the HNBRs of the body mixtures, fabric treatment and cord treatment permit to have a belt maintaining the mechanical characteristics in the whole range of temperatures.

This result is further improved if the fabric is coated with a resistant layer comprising a fluorinated plastomer with the addition of an elastomeric material comprising one or more copolymers, which is/are formed starting from a monomer containing nitrile groups and from a diene, in which the monomers containing the nitrile groups are in a weight percentage of between 30 wt % and 39 wt %. Moreover the result is further improved when also the back of the belt is coated with a similar resistant layer.

The invention claimed is:

1. A method of forming a belt comprising:
   forming a plurality of cords;
   treating said cords with an aqueous mixture of one or more copolymers not comprising resorcin-formaldehyde latex, obtained starting from a diene monomer and a monomer containing nitrile groups in a weight percentage of between 30% and 39% with respect to the total weight of said copolymer, thereby forming treated cords:
   wherein said aqueous mixture of one or more copolymer not comprising resorcinol and formaldehyde is constituted by a coating liquid comprising a rubber latex comprising said copolymer, a vulcanizing agent and at least 50% weight of water,
   forming a fabric;
   treating said fabric with a non aqueous mixture of one or more copolymers not comprising resorcinol and formaldehyde, obtained starting from a diene monomer and a monomer containing nitrile groups in a weight percentage of between 30 wt % and 39 wt % with respect to the total weight of said copolymers obtained starting from a diene monomer and a monomer containing nitrile groups in a weight percentage of between 30 wt % to 39 wt % with respect to the total weight of said copolymers, thereby forming a treated fabric;
   forming a body and embedding said treated cords in said body, said body having a plurality of teeth extending from at least one first surface of said body, said body formed of a mixture of one or more copolymers, obtained starting from a diene monomer and a monomer containing nitrile groups in a weight percentage of between 30 wt % to 39 wt % with respect to the total weight of said copolymers and coating said teeth with said treated fabric, wherein said fabric is externally coated with a resistant layer comprising a fluorinated plastomer, an elastomeric material and a vulcanizing agent.

2. The method according to claim 1, wherein said first elastomeric material comprise nitrile groups in a weight percentage of between 34 wt % to 36 wt % with respect to the total weight of said copolymers.

3. The method according to claim 1, wherein said second elastomeric material comprise nitrile groups in a weight percentage of between 34 wt % and 36 wt % with respect to the total weight of said copolymers.

4. The method according claim 1, wherein said third elastomeric material comprise nitrile groups in a weight percentage of between 30 wt % and 32 wt % with respect to the total weight of said copolymers.

5. The method according to claim 1, wherein said fluorinated plastomer is present in said resistant layer in an amount greater than said fourth elastomeric material.

6. The method according to claim 1, wherein said resistant layer comprises said fluorinated plastomer in an amount in weight of between 101 and 150 parts in weight with respect to said elastomeric material.

7. The method according to claim 1, wherein said fourth elastomeric material is formed of a mixture of one or more copolymers, obtained starting from a diene monomer and a monomer containing nitrile groups in a weight percentage of between 30 wt % and 39 wt % with respect to the total weight of said copolymers.

8. The method according to claim 7, wherein said fourth elastomeric material comprises nitrile groups in a weight percentage of between 34 wt % and 36 wt % with respect to the total weight of said copolymers.

9. The method according to claim 1, wherein said cords are made of a material chosen in the group consisting of made up of glass fibres, aramidic fibres, carbon fibres, PRO fibres, and mixtures thereof.

10. The method according to claim 1, wherein said fabric comprises polyamide.

11. The method according to claim 10 wherein said fabric comprises aromatic polyamide.

12. The method according to claim 1, wherein the back of said belt is coated with a second fabric.

13. The method according to claim 12, wherein said second fabric is externally coated with a second resistant layer.

14. The method according to claim 13, wherein said second resistant layer is the same as said first resistant layer.

15. The method according to claim 1, wherein said first elastomeric material comprises fibres.

16. The method according to claim 15, wherein said fibres are present in an amount in weight of between 2 and 40 phr with respect to said elastomeric material.

17. The method according to claim 1, wherein said first, second and third elastomeric materials are constituted by HNBR.

18. The method according to claim 1, wherein the ratio between said third elastomeric material and said vulcanizing agent in said coating liquid of said cord treatment is from 2 to 1 wt % to 1 to 2 wt %.

\* \* \* \* \*